Sept. 25, 1934.   L. A. PARADISE   1,974,972
DUMP RAKE
Filed May 3, 1933
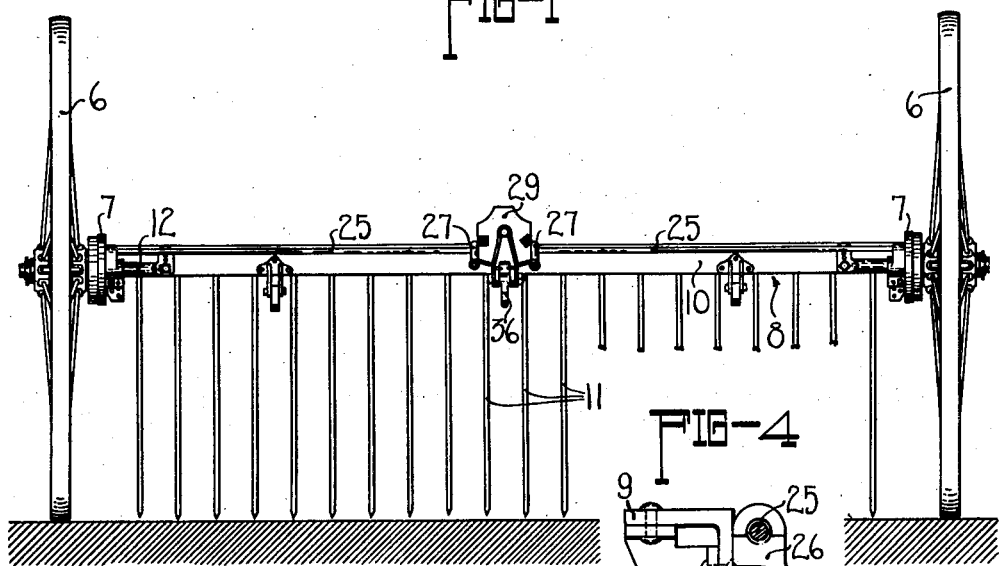
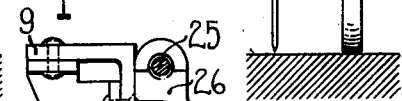
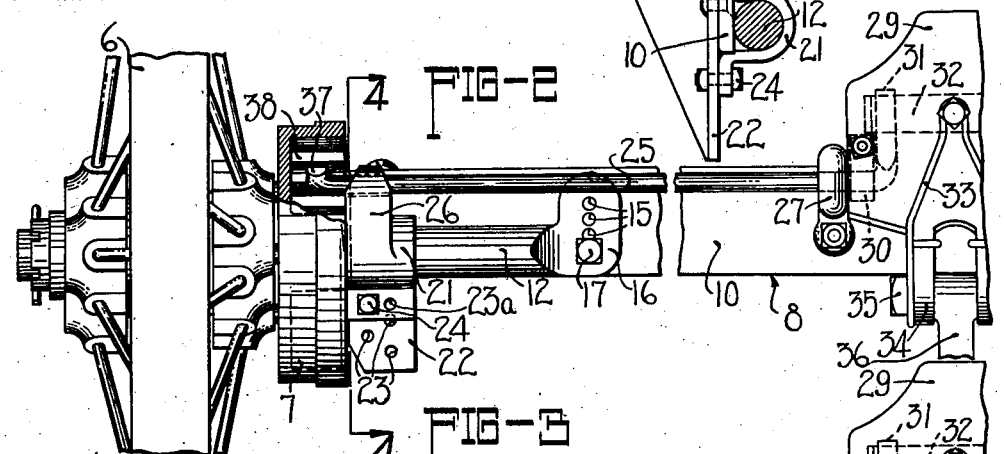
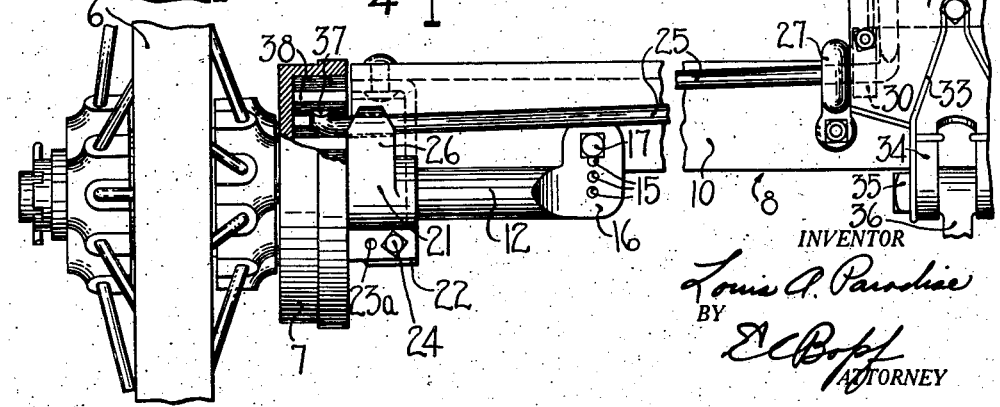
INVENTOR
Louis A. Paradise
BY
ATTORNEY Patented Sept. 25, 1934

1,974,972

UNITED STATES PATENT OFFICE 1,974,972

DUMP RAKE

Louis A. Paradise, Moline, Ill., assignor to Deere & Company, Moline, Ill., a corporation of Illinois Application May 3, 1933, Serial No. 669,152

5 Claims. (Cl. 56—391)

My invention relates to dump rakes, and particularly to dump rakes wherein the power for dumping is obtained from the rotation of the carrying wheels through trip rods carried on the rake head and having operative association with ratchet drums fixed to the carrying wheels.

The principal object of my invention is to provide a dump rake of this type wherein the position of the rake head relative to the supporting wheels may be adjusted to vary the operating position of the rake teeth relative to the ground.

Another object of my invention is to provide a dump rake wherein the position of the rake head relative to the supporting wheels may be adjusted and wherein the outer ends of the trip rods will automatically be maintained in operative position with respect to the ratchet drums on the wheels in all positions of adjustment.

I accomplish these objects by providing wheel axles which are adjustably connected to the rake head whereby the vertical position of the rake head may be varied, and by providing bearing supports on the axles for the outer ends of the trip rods, as a result of which the outer ends of the trip rods are held in proper operating position with respect to the ratchet drums on the wheels irrespective of the vertical position of the rake head relative to the axles.

A preferred embodiment of my invention is described in detail in the following specification in connection with the accompanying drawing, wherein:

Figure 1 is a front elevational view of my improved dump rake;

Figure 2 is an enlarged detail view of one side of the rake showing a wheel axle adjusted so as to position the rake teeth to the lowest operating position;

Figure 3 is a view similar to Fig. 2 but showing the wheel axle adjusted so as to position the rake teeth to the highest operating position; and, Figure 4 is a sectional view taken on the plane of the line 4—4 of Figure 2.

The dump rake comprises carrying wheels 6 having ratchet drums 7 secured to or formed integral with the hubs thereof. The wheels 6 are disposed adjacent the opposite ends of a transverse rake head 8 and serve to support the rake head.

The rake head 8 is preferably formed of an angle iron beam having a horizontal flange 9 extending rearwardly and a vertical flange 10 extending downwardly. The rake head 8 carries a plurality of rake teeth 11 which are secured to its horizontal flange 9 and extend rearwardly therefrom in the usual manner.

Adjustably secured to each end of the rake head 8 is a stub axle 12 upon which the carrying wheels 6 are journaled. A plurality of holes 15 are provided in an upwardly extending swaged portion 16 formed on the inner end of each axle 12 for receiving a bolt 17 provided in vertical flange 10 of the rake head. Each hole 15 determines a particular position of the rake head relative to the ground. An axle bracket 21 is disposed on each stub axle 12 adjacent the ratchet drum 7 of the wheel mounted thereon. Each bracket is adjustably connected to a supporting arm 22 secured to rake head 8 and forming a depending extension of the vertical flange 10. A bolt 24 is disposed in one of the holes 23a in bracket 21 and in a selected one of a plurality of holes 23 provided in arm 22. The holes 23 are spaced apart vertically the same distance as are holes 15 so that axle 12 will be parallel with rake head 8 in all of the adjusted positions of the axle.

The rake teeth 11 are raised out of operative position into dumping or transport position by revolving rake head 8 about the axial line of stub axles 12, the rake head 8 being revolved by power supplied from carrying wheels 6, in the usual way, through a pair of aligned trip rods 25. These rods are approximately half as long as rake head 8 and extend in opposite directions from the center thereof. The inner ends of the trip rods are supported in bearing brackets 27 secured on vertical flange 10 and pivotally support a trip plate 29 by means of bearing clips 30. The upturned inner ends 31 of rods 25 are loosely and yieldingly connected with trip plate 29 through a connecting strap 32 and a hairpin spring 33. The loop of spring 33 embraces a bolt fixed to strap 32 and extending through a perforation in plate 29. The ends of spring 33 are anchored to the depending arms 34 on plate 29 by means of bolt 35. Bolt 35 pivotally connects the actuating rod 36 to the trip plate 29. The outer ends of rods 25 are journaled in bearing members 26 formed integral with axle brackets 21. The extreme outer ends of trip rods 25 are provided with upturned dogs 37 which are adapted to engage with internal teeth 38 of the ratchet drums 7 when the shafts are rocked counterclockwise by the actuation of the trip plate 29. Engagement of dogs 37 with the ratchet drums 7 locks the rake head to the wheels, causing the former to rotate upwardly to a dumping position. Upon reaching this position the trip plate 29 is rocked back to its normal position causing dogs 37 to disengage, whereupon the rake head falls back to its normal raking position. For a more detailed description of the tripping mechanism, reference may be had to Patent No. 1,850,384 issued to Wilbur J. Coultas on March 22, 1932.

When it is desired to adjust stub axles 12 relative to rake head 8, bolts 17 and 24 are removed, the axles shifted to the desired position and the bolts inserted in the newly aligned holes in the respective members. By reason of the outer ends of trip rods 25 being supported on brackets 21, the outer ends of the trip rods are adjusted simultaneously with stub axles 12 and are therefore maintained in proper operating position with respect to ratchet drums 7 in all positions of adjustment of the axles, as is demonstrated in Figures 2 and 3, showing the two extreme positions of adjustment. When axles 12 are positioned as shown in Figure 3, trip rods 25 are in an inclined position, but the angle of inclination is so slight that the proper engagement of the dogs 37 with the teeth 38 of the ratchet drums is not affected. Brackets 27 are secured to the rake head 8 as close to the trip plate 29 as possible so that the slight inclination of the trip rods 25 will not affect the connection of these rods with the trip plate.

Having described my invention, what I claim as new and desire to secure by Letters Patent is set forth in the following claims:

1. A dump rake comprising a rake head, a pair of supporting wheels and stub axles therefor adjustably connected to the opposite ends of said rake head whereby the vertical position of said rake head may be varied, a ratchet drum secured to each wheel, a pair of trip rods having their inner ends journaled on said rake head, dogs on said trip rods cooperating with the ratchet drums to cause rotation of the rake head when the trip rods are rocked to a certain position, and a bearing support on each axle adjacent to the drum of the wheel thereon in which the outer ends of said rods are journaled, whereby said dogs are maintained in operative position with respect to said drums in all positions of vertical adjustment of said rake head.

2. A dump rake comprising a rake head, a pair of supporting wheels and stub axles therefor adjustably connected to the opposite ends of said rake head whereby the vertical position of said rake head may be varied, a ratchet drum secured to each wheel, a pair of trip rods having dogs on their outer ends cooperating with the ratchet drums to cause rotation of the rake head when the trip rods are rocked to a certain position, a tripping plate on the rake head with which the inner ends of the trip rods are loosely connected for rocking said rods, bearings for the inner and outer ends of said trip rods, the bearings for the outer ends being mounted on said stub axles adjacent the drums of the wheels thereon whereby said dogs are maintained in operative position with respect to said drums in all positions of vertical adjustment of said rake head, and the bearings for the inner ends of said trip rods being mounted on said rake head adjacent said tripping plate whereby the operative connection of the inner ends of the trip rods with the tripping plate is not affected by the vertical adjustment of said rake head.

3. In combination with a dump rake comprising a rake head provided with rake teeth, carrying wheels, stub axles for said wheels, ratchet drums secured to said wheels, a tripping mechanism mounted on said rake head between said carrying wheels, aligned trip rods operatively engaging with said tripping mechanism and said drums, of means for adjusting said axles in parallel relation to said rake head, said means comprising a flattened upwardly extending portion on the inner ends of said axles having a plurality of holes adapted to be selectively engaged by a bolt extending through said rake head and axle brackets on said axles adjacent said ratchet drums and adjustably mounted on said rake head, and means on said brackets for supporting the outer ends of said trip rods, whereby said trip rods are maintained in operative engagement with said drums in all adjusted positions of said axles.

4. In a dump rake the combination of a rake head provided with rake teeth extending to within close proximity to the ground, carrying wheels, stub axles for said wheels, ratchet drums secured to said wheels, aligned trip rods having their outer ends disposed in operative relation with said drums and having their inner ends carried by said head, and means for connecting the inner ends of said axles to said head at any one of a plurality of vertically spaced positions whereby the position of said rake teeth relative to the ground may be adjusted, and for supporting the outer ends of said trip rods on said rake head at any one of a plurality of correspondingly vertically spaced positions whereby the outer ends of said trip rods may be maintained in proper operative relation with said drums by correspondingly changing the supporting position of the outer ends of said trip rods whenever the vertical position of the connection of said axles to said rake head is changed to adjust the position of the rake teeth relative to the ground.

5. A dump rake having a rake head comprising an angle iron beam disposed with one flange extending horizontally and rearwardly and the other flange extending vertically and downwardly when the rake head is in raking position, curved rake teeth carried by the horizontally extending flange and disposed to rake the ground surface, a pair of carrying wheels and stub axles therefor, and means for connecting said axles to said vertical flange at any one of a number of vertically spaced positions thereon, whereby the position of said rake teeth relative to the ground surface may be adjusted.

LOUIS A. PARADISE.